April 7, 1953 W. W. PAUL 2,634,002
OVEN LOADER AND UNLOADER
Filed Jan. 13, 1948 6 Sheets-Sheet 1

INVENTOR.
WILLIAM W. PAUL
BY Howard J. Whelan.
ATTORNEY

INVENTOR.
WILLIAM W. PAUL
BY Howard J. Whelan.
ATTORNEY

April 7, 1953 W. W. PAUL 2,634,002
OVEN LOADER AND UNLOADER
Filed Jan. 13, 1948 6 Sheets-Sheet 3
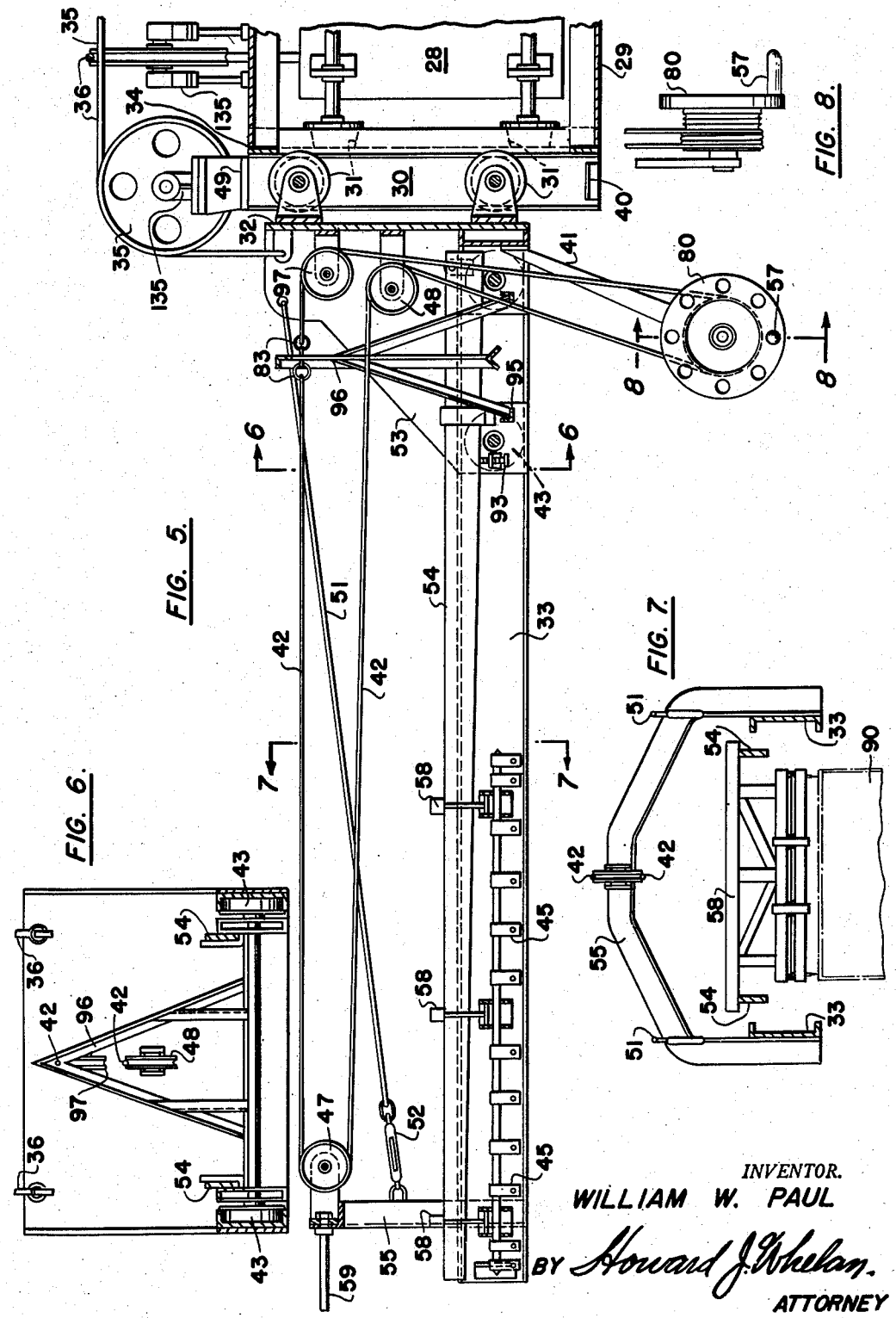
INVENTOR.
WILLIAM W. PAUL
BY Howard J. Whelan
ATTORNEY

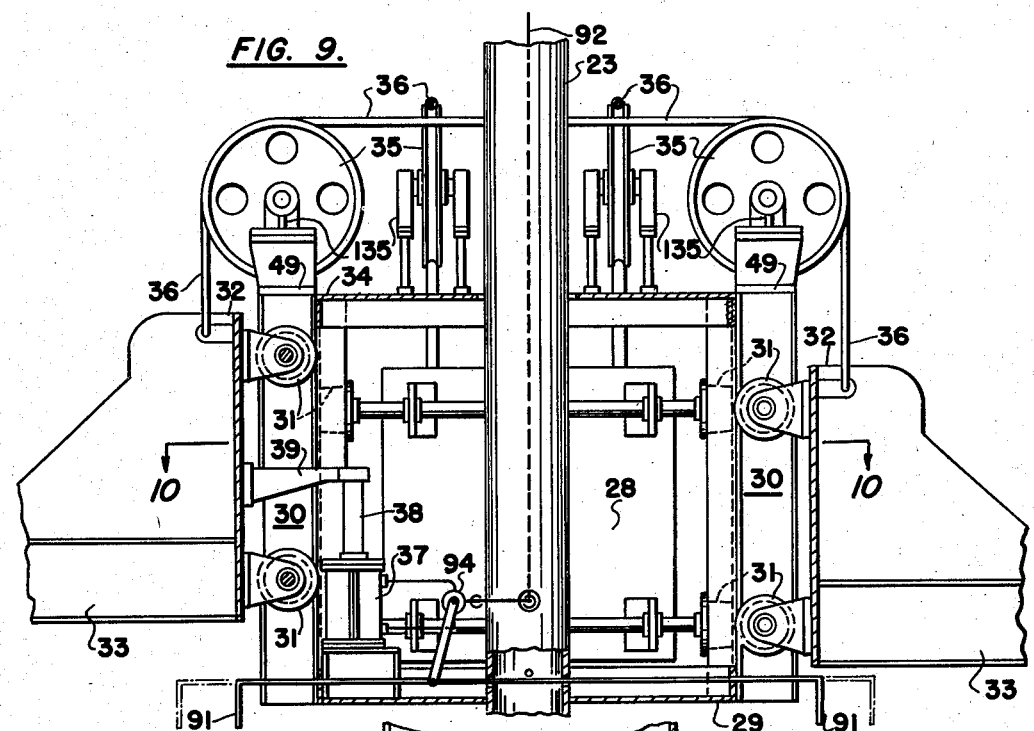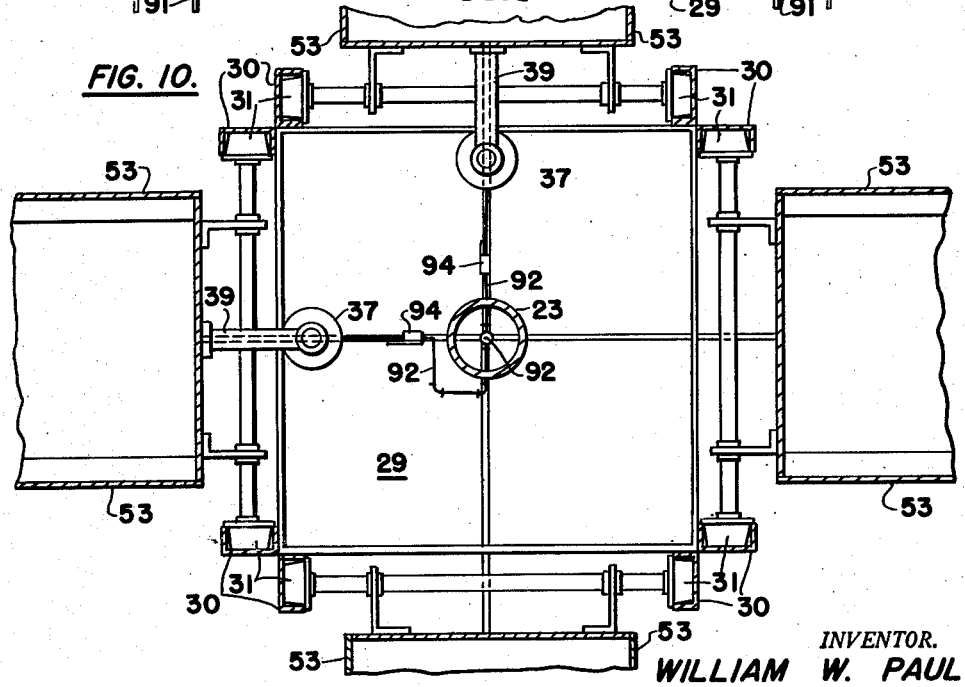

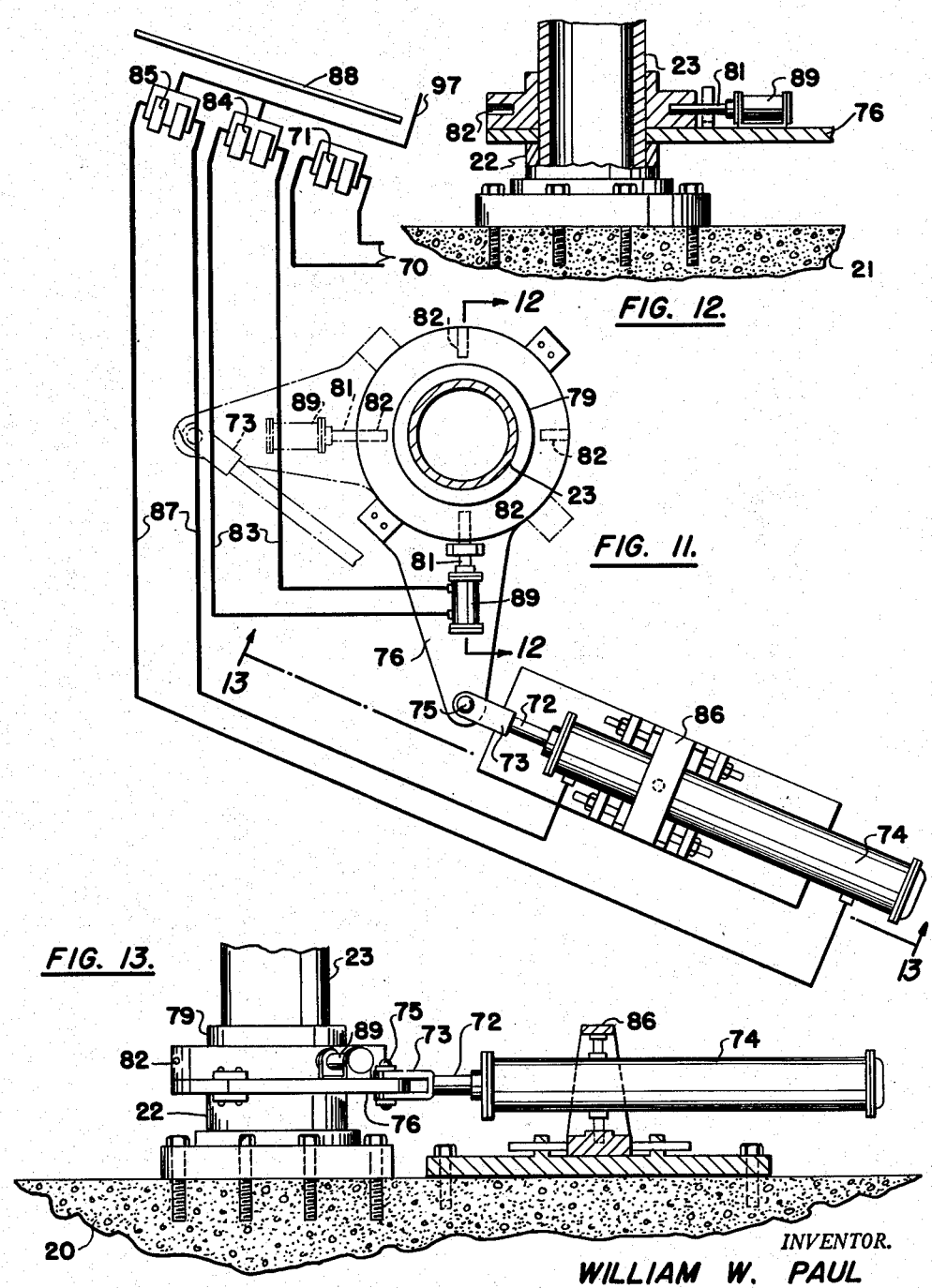

April 7, 1953 W. W. PAUL 2,634,002
OVEN LOADER AND UNLOADER
Filed Jan. 13, 1948 6 Sheets-Sheet 6

INVENTOR.
WILLIAM W. PAUL
BY Howard J. Whelan
ATTORNEY

Patented Apr. 7, 1953

2,634,002

UNITED STATES PATENT OFFICE 2,634,002

OVEN LOADER AND UNLOADER

William W. Paul, Baltimore, Md.

Application January 13, 1948, Serial No. 1,941

4 Claims. (Cl. 214—26)

This invention relates to equipment for handling and conveying articles during various stages of production and particularly where a particular phase of the manufacture involves a special treatment of the articles, such as heating, baking, dipping or otherwise treating the articles that require designated periods of time, for the treatment.

Particular equipment for the handling of articles under production during manufacture frequently have arrangements for tilting upward at its end for conveying the articles from a certain portion of its structure to another or for projecting it out of its original position into the space beyond, so it may enter a furnace or other treatment structure, the end lowered and after the process, returning to its original position again, for removal, and other disposition. The equipment usually has limitations that restrict its use to a single function, and thus does not provide for economy of such equipment in general in that it is cumbersome and involves the use of dead counterweights, while also involving structural changes in the building in which it is to be used, that are extremely costly.

Thus the equipment, usually comprises a fork, which has certain limitations that restrict its use to a single function, and thus does not provide for economy of production in the articles that it handles. When box furnaces were first used for firing vitreous enamel, the furnace was charged with a fork small enough to be handled manually. As the furnaces were built larger, the forks too were built in proportion and were supported on a framework fastened to the floor. The up and down motion necessary to deposit the ware on pigs in the furnace was usually obtained with a cam near the furnace door. The movement of this cam was regulated by the operator at the rear of the fork by means of a rod and lever. This type of fork meant the handling of the fired ware at elevated temperatures in order to expedite the unloading and the loading of a new charge. The next step was the double fork with wheels running on a track, either set in the floor or supported overhead. This method gave the operator more time to unload and load, in that while one load was in the furnace, the second fork was made ready. In the pulling of ware from the furnace with the first fork the second fork was then wheeled in position and the ware run in. This method was a step forward, but the ware was still hot when removed and the burning tools radiated a lot of heat in both removing the ware and loading a new charge. The burning time too was a great handicap, for the time to unload and load was governed by the length of time one load was in the furnace. Time being a factor, most furnaces were undercharged in that the ware was laid flat on points, whereas the same furnace could fire at least 100% more if the ware hung from hooks, but this was impracticable due to lack of time. Then too, to hang the ware, heavy alloy racks were necessary which caused trouble due to the excess weight.

Another drawback to the double fork was the floor space necessary for its operation.

The rotary fork described later increases this time factor many times and eliminates all handling troubles due to hot ware and burning tools.

It is therefore an object of the present invention to provide a new and improved mechanical handler that will eliminate one or more of the disadvantages and limitations of the previous art.

Another object of this invention is to provide a new and improved handling unit that will serve as a hanger for the loading portion of its operation; as a carrier for loading furnace or oven and unloading at another portion, as a handler and cooling and/or drying at another portion, to manipulate the articles being processed by it in a predetermined manner. In other words to provide for a plurality of purposes in the handling and processing of the articles.

A further object of the invention is to provide a new and improved mechanical handling machine that will be efficient and effective in its operation, will provide for the accurate timing of its operations, will do its work safely as far as the operators working with it are concerned, and will be automatically adjustable to do its handling in an accurate manner, so the articles processed and other equipment it is used with, may not be unnecessarily damaged.

An additional object of the invention is to provide a new and improved mechanical handling machine that will employ one or a number of radial booms suitable for supporting various products positioned thereon that will also operate in pairs, one boom balancing the other without the use of counterbalancing means.

Other objects will become apparent as the invention is further disclosed.

For a clearer understanding of the invention, its objects and the principles thereof, reference is made to the appended drawings. These drawings together with the following description portray a particular form of the invention by way of example, while the scope of the invention is particularly pointed out in the claims.

In the drawings:

Figure 5 is an enlarged side elevation of one of the booms and pair of forks of the machine with portions sectioned to show the inside construction, this view being taken on line 5—5 of Figure 4.

Figure 6 is a sectional detail of the boom carriage, taken on line 6—6 of Figure 5;

Figure 7 is a sectional view in elevation taken on line 7—7 of Figure 5 of the article carrier and its pulley arch frame;

Figure 8 is a detail of the drum wheel for winding up the pulley rope attached to the carrier to move it in or out and taken on line 8—8 of Figure 5;

Figure 9 is a partial sectional elevation of the supporting column mechanism taken on line 9—9 of Figure 4;

Figure 10 is a sectional plan view taken on line 10—10 on Figure 9;

Figure 11 is a plan view partly in section of the pneumatic drive and column mechanism with its control piping diagrammatically arranged;

Figure 12 is a sectional view taken on line 12—12 of Figure 11;

Figure 13 is a side elevation of the pneumatic drive looking in the direction of line 13—13 of Figure 11;

Similar reference characters refer to similar parts throughout the drawings.

Figure 1:
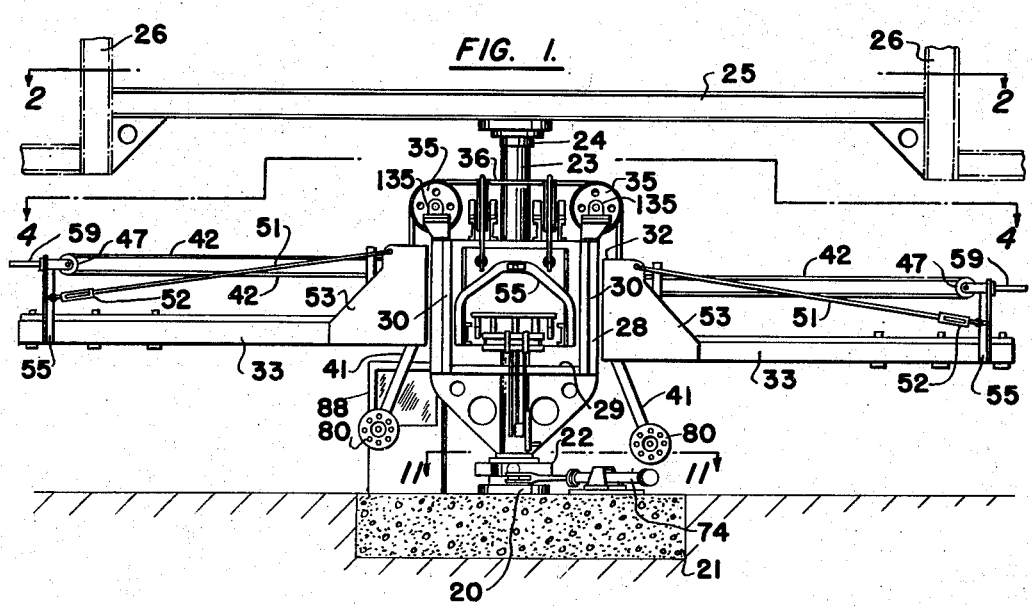
Figure 1 is a rear end elevation of a handling machine unit for the processing of articles to be enamelled, and embodying this invention.
Figure 2:
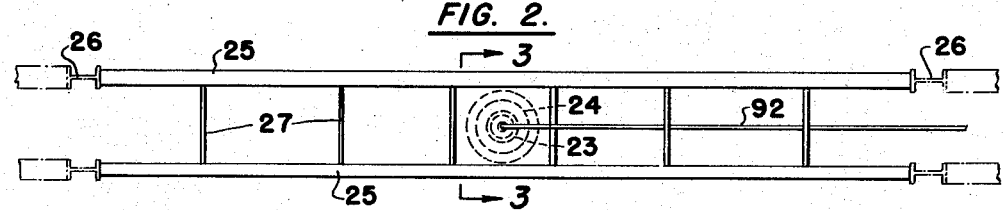
Figure 2 is a plan view of the thrust bearing support taken on line 2—2 of Figure 1.
Figure 3:
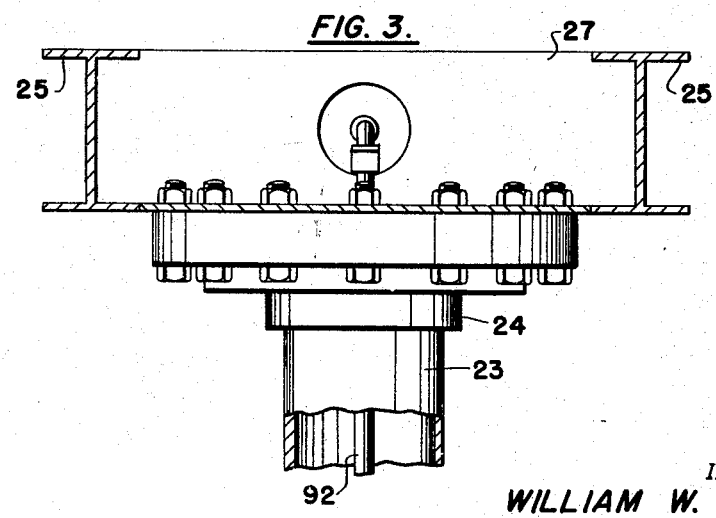
Figure 3 is an enlarged detail in elevation of the thrust bearing taken on line 3—3 of Figure 2.

In the particular form of the invention shown in these drawings, a machine for handling articles to be vitreous or synthetic enamelled includes a central supporting pedestal that is rotatable on a vertical axis in bearings attached to the floor of a building and to the structural work, at a level above the floor and suitable for the purpose. The machine is designed especially for use in processing porcelain or synthetic enamelled articles. The pedestal supports a structural cage and carries it around with it as it rotates. This cage holds the mechanism that suspends several booms with movable forks and carries them around with it to periodical stopping stages. These stages are so arranged that articles are mounted on the forks, which are spaced to suit the purposes in order that a particular process may be conducted at each stop for each fork, different and independent from the others. For example in the illustrations shown in the drawings, one of the forks is used for placing the articles in a furnace or oven to be fired or baked. At the same time another fork suspends the articles, that have just come out of the furnace or oven, to cool. Another fork places the particular articles that have already cooled, in a position for removal from the machine; while a fourth fork being empty, enables the incoming articles to be attached to it and made ready for the next stage, that of firing or heating.

The pedestal is rotated periodically through predetermined segments of travel by a pneumatic driving mechanism. It is worked intermittently, so that periods of time sufficient to allow for the necessary heating, cooling, removal and attaching of articles are provided for. The movable forks are of considerable size and weight in their normal construction, and are raised and lowered, extended in part and withdrawn during the processes, according to the needs. To keep the weight of the structure to a lower limit, when more than one fork is used, and avoid the use of heavy counterweights, the booms and forks are so arranged that one set balances another. Further, when the forks are extended into the furnace or oven where the articles are heated, arrangements are made to place the carrier in the furnace or oven by the fork, then the carrier is lowered and placed on supports, and then the fork is withdrawn, so the articles on the carrier may be left in the furnace or oven to heat or bake. The same fork is returned to the furnace or oven and raised to pick up the carrier and later withdraws the carrier from the furnace or oven with the articles thereon, with a reverse operation. Then to provide the necessary alignment of the forks with the center of the oven when the door is open, special guide means are used on the latter to accurately position it before it passes into the furnace or oven. This prevents the particular fork from injuring the walls of the furnace or oven and also the wrong positioning of the carrier inside the latter, when the carrier, with the fork, is propelled into the furnace. Other features are provided for facilitating the work of the machine.

Referring to the drawings, a machine for handling articles to be enamelled has a suitable circular base 20 set in a concrete foundation 21 positioned in the floor of the building used. This base has a thrust bearing 22 vertically mounted on it. A central supporting pedestal 23 is rotatable in the bearing 22 and extends vertically upwards to a second thrust bearing 24, which keeps it properly positioned. The bearing 24 is held in place by structural beams or channels 25 that are normally attachable to the structural work 26 of a building. The beams 25 are suitably braced by lateral struts 27. A rectangular cage 28 is fastened to the pedestal 23 with its flooring 29 positioned off the floor of the building at a level sufficient to allow the operators to work freely under it. This cage 28 includes eight channels 30, two at each corner vertically positioned and with the flanges serving as a rail track for the inner wheels 31. There are two sets of these wheels 31 mounted near the edges adjacent two sides of four bogies 32 serving as the supporting framework for four pairs of I-beam booms 33 extending rigidly from them like spokes from a hub. The wheels 31 are vertically disposed over each other and enable the bogies to run up vertically on the channels 30 in which they are set. The wheels are used to lessen friction and facilitate the operation of the bogies. The bogies 32 are of triangular box-like form with substantial side plates 53 connected to the booms to reinforce their support. The booms 33 are flanged to support the wheels of the carrier 95 for the forks 54 running on them. The forks 54 are tapered with the smaller ends outwardly extended. Guy wires 51 are tied into the side plates 53 and the sides of an end frame 55. Turnbuckles 52 are used to hold and keep the booms 33 from sagging. The plane of the upper surface of each fork is above that of the boom on which it is installed.

Figure 4:
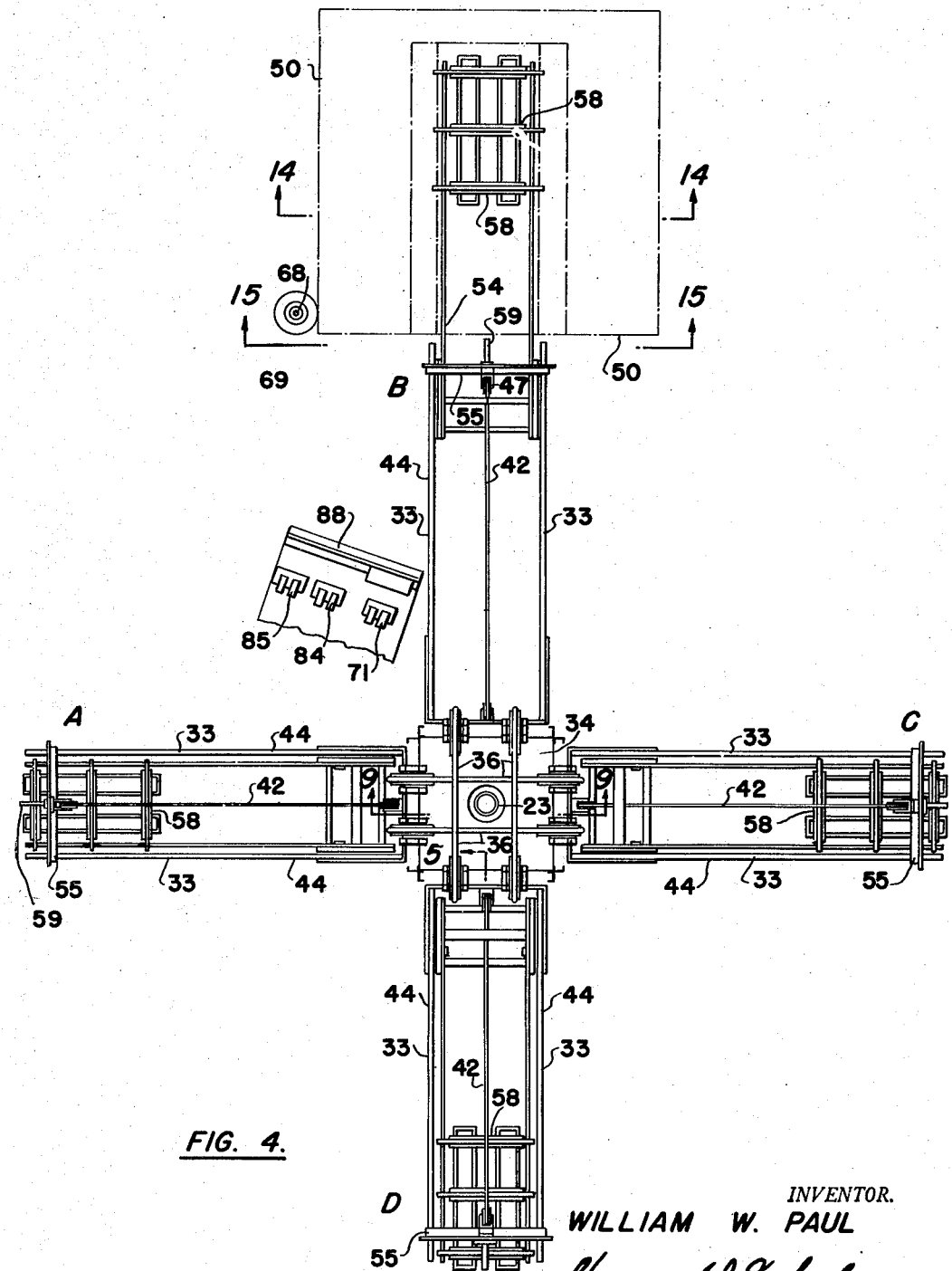
Figure 4 is a plan view of the handling unit and box furnace or baking oven viewed along the line 4—4 of Figure 1.
Figure 14:
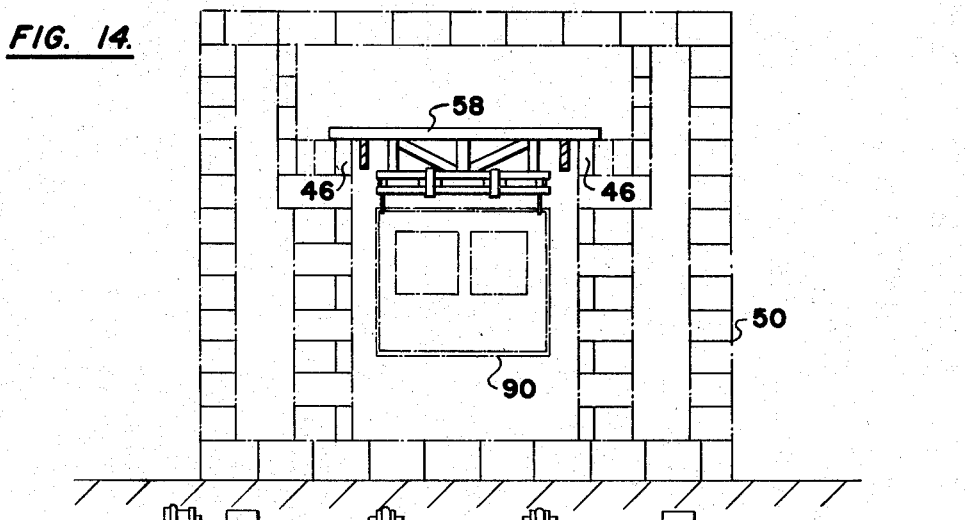
Figure 14 is a detail showing the operating position of the carrier with respect to a dotted furnace or oven structure used for firing or baking the articles to be enamelled.
Figure 15:
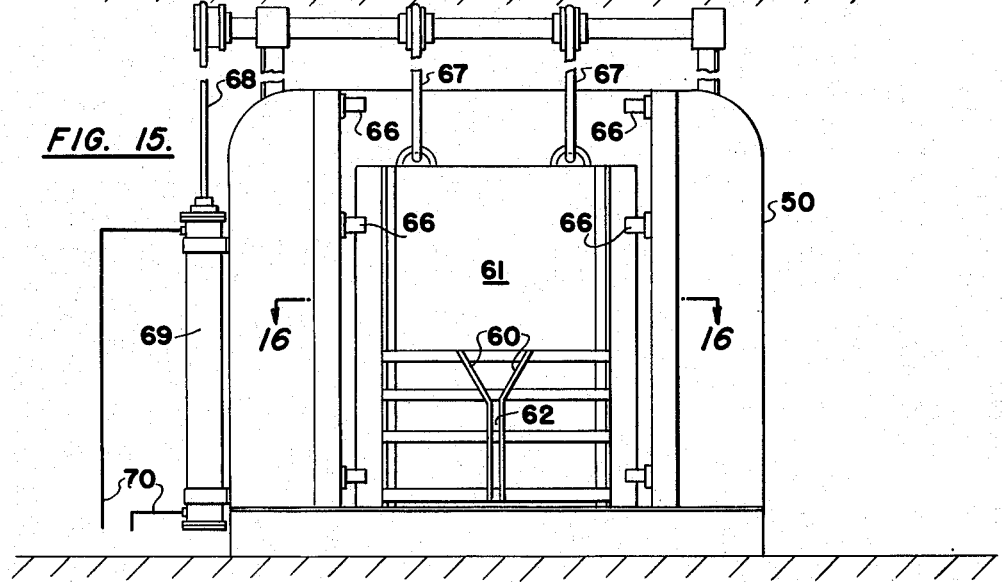
Figure 15 is a front view of the furnace or oven used with this embodiment of the invention with the furnace or oven door closed and the Y-guide thereon for accurately positioning the boom and carrier with respect to the furnace or oven.
Figure 16:
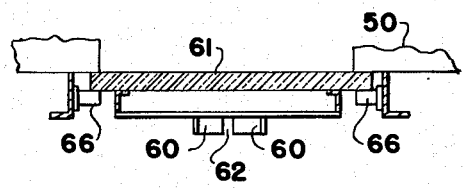
Figure 16 is a detail of the door structure used in the furnace or oven, the view being taken along line 16—16 of Figure 15.

The channels 30 form a four corner structure joined to the floor plate 29 below and top crosspieces 49 above. The ceiling plate 34 of the cage is open so the pedestal 23 can pass unobstructed through it. Brackets 135 are supported on the channels 30 and carry sheaves 35 which in turn guide and carry the balance ropes 36. The ropes 36 run in pairs across the top of the cage 28 and connect to bogies of the opposite booms, so that each boom is balanced by its opposite boom. This permits one cylinder 37 through its piston rod 38 and brackets 39 to operate each opposite pair of booms. When the cylinder 37 is pneumatically operated it raises the bogies 32 of one boom. This boom in rising permits the ends of ropes 36 attached to it to rise also and in doing so, the weight of the opposite boom released of its balance, is sufficient to lower it. Thus when one boom of a pair rises, the opposite pair is lowered. The cylinder 37 in each case is so arranged that air pressure is on one side or the other of its piston at all times. This acts as a restraint to prevent undesirable movement of the booms, except when actually functioning. Pneumatic power is preferably used throughout the machine, for operating the cylinders as it is safer for the work involved. Limit angles 40 are provided on the channel rails 30 at predetermined points to control the movement of the booms, in case, one or more of the ropes 36 should break and allow the booms to lower unexpectedly. Projecting down from the bogie is a bracket 41 with a grooved spool 80 adapted to receive a doubled-back rope 42 therein, for winding it up either way. The ends of the rope 42 are secured to its carrier 95 on an A frame 96 rigidly projecting from it for pulling it back or forward thereon. Each carrier 95 rolls with flanged wheels 43, running on the flanges of the two parallel and spaced beams 44 that make up each boom. The rope 42 is attached to rings 83 arranged on the A frame 96 to pull the carrier from the pedestal end of the boom to the outer or extending end where it projects the fork 54 a considerable part of its length outside and into the furnace or oven 50 as shown in Figure 4. This fork 54 supports a frame 58 which is arranged with various hooks or hangers 45 to hold the different articles 90 to be heated and fired thereon when placed in the furnace or oven 50. The frame 58 is readily detached from the fork 54. This is done in the furnace or oven 50 by providing ceramic rests or pigs 46 so placed therein as to engage the undersides of the frame 58 when the boom 33 is lowered. The rests or pigs 46 then sustain the frame 58 and the articles 90 thereon to be enamelled (in this instance).

The carrier 95 with its fork 54 is propelled outwards from its respective boom 33 by the rope 42 which passes over a pulley 47 positioned on an arch frame 55 at the end of the boom, the rope then is attached at one end to A frame 96, passing over another pulley 48 and then down and over the spool 80 and back over another pulley 97 and anchored to said A frame as shown in Figure 5, so that when the rope 42 is wound up over the spool 80 having right and left hand windings will either force the fork out beyond the boom or retract it within the area encompassed by the beams 44.

When the fork is put in the position where it overhangs the boom, it carries the frame 58 that holds articles 90 therewith so the frame 58 may be removed readily, if lifted up sufficiently and the fork 54 withdrawn. The arch frame 55 has a guide pin 59 projecting out at right angles towards the furnace or oven 50 as the fork is aligned therewith. This guide pin 59 is brought in front of the middle portion of the oven door 61 and causes its opening when rotated into that segment of its travel. Since the fork may not align accurately with the center line of the oven opening, it is necessary to have it aligned by some positive means that will bring it to an accurate registry. The guide pin 59 enables this to be done, when a Y-guide frame 60 fastened to the oven door 61 is raised. The arms of the Y-frame are sufficiently separated at the top to engage the pin 59 even if out of line for a distance of several inches. Then as the door and arms are raised further they guide the pin to the middle raceway 62 where the pin 59 is accurately placed. The alignment of the pin 59 carries the fork 54 (and boom 33) over so its center line will be in line with the raceway also and the central portion of the furnace or oven. When so aligned the fork is in a position to place the frame 58 with articles 90 on it so they can both be pushed into the open furnace or oven without being obstructed by any part of the furnace or oven. When in the furnace or oven, the frame 58 is lowered down on the brickwork 46 as the fork 54 and beams 44 are lowered, with sufficient leeway to permit the fork to be withdrawn, leaving the carriage and articles thereon in the furnace or oven.

The furnace or oven door 61 has side channels 66 to guide it on the front of the oven structure 50. It is raised by cables 67 connected to a mechanism 68 operated by a pneumatic cylinder 69. Piping 70 feeds the cylinder with air and the pedals 71 control its operation. The pedals 71 are located at a place accessible to the operator who controls them and other mechanisms of the machine.

The central pedestal 23 is rotated by the rod 72, link 73 of a cylinder 74. The link 73 is loosely swung on the pin 75 of an arm 76 attached to loosely encompass the pedestal 23 above the bearing 22 and below a collar 79 mounted on it. The collar 79 is secured tightly to the pedestal 23, so that its rotation will induce the rotation of the pedestal. The loose arm 76 supports a small pneumatic cylinder 89 that projects or withdraws a bolt 81 from or into holes 82 in the rigid collar 79. The movement of the arm 76 by the cylinder 74 which is pivoted to a bracket 86 moves the rod 72, link 73 and arm 76 with the cylinder 89 thereon so that they will, through the insertion of the bolt 81 in the hole 82 selected, rotate the column 23 clockwise through a 90° arc. If the bolt 81 is withdrawn or unbolted at the moment, they will rotate this travel without moving the pedestal. If in the last position the bolt 81 should be inserted in the recess or hole 82 at the 90° location, the cylinder on receiving air in reverse will pull the column 23 back counterclockwise through a 90° arc. The cylinder 89 has piping 83 controlling it through its pedals 84, while the pedals 85 control the cylinder 74 through the piping 87. All the control pedals are located close together and preferably in back of a glass shield 88 erected in the vicinity of the column 23. When the pedestal 23 is rotated through its quadrants, it carries all the forks with it so they take up a position 90° ahead of the previous position.

In its operation, the various arms are first positioned in the locations marked A, B, C, D on the drawings. A, is the loading position for the fork in that place. There, the articles to be processed are attached. B, is the heating position for the fork, in that place, and it is ready for the placement of the articles thereon into the furnace or oven. C, is the cooling position for the fork in that position, and allows the articles just pulled out of the furnace to be held stationary during the period between quadrant travels, so they can cool off. D, is the position for the fork where the articles can be removed, and the carriage made ready for the next load to be attached at A. In beginning the operation of the machine and the processing of the articles thereon, the operator operates the pedal 84 and forces pin 81 into hole 82 and pedal 85 that advances the pedestal 23 one quadrant or 90°. This carries the fork loaded at A, to position B, ready for placement in the furnace or oven for firing. The operator releases his foot from the pedals and leaves the forks in their respective "second" positions. The operator then raises the furnace or oven door 61 by operating the pedal 71 which on rising, positions the fork at location B, the guide pin 59 is pushed into alignment by the Y-frame 60, so it is centralized in front of the open furnace or oven. The operator then turns the spool handle 57 until the carrier fork 54 has rolled, along the beams 44 under the action of the winding of the ropes 42, and positioned itself with its carriage 58 and articles 90 within the heated furnace or oven 50, where they are stopped. The operator then operates the handle 91 and balance cylinders 37 to lower this fork and deposit the frame 58 on the ledges or pigs 46 provided in the walls of the furnace or oven for it. The carriage is thereby lifted off the fork 54 as the latter is lowered with its supporting boom 33 a short distance further and to be withdrawn without obstruction. The lowering of this boom pulls on the balance ropes so they cause the rise of the opposite boom and hold it there. The fork 54 is then withdrawn from the furnace and the furnace door 61 closed. The articles to be enamelled are then subjected to the heat of the furnace or oven, until they are removed. After a suitable period of time, the furnace or oven door is raised, as before the fork in lowered position is run in into the furnace or oven, under the frame 58, then the fork is raised and the carriage lifted off the ledges 46 by the fork. The frame 58 is then drawn out of the furnace or oven, back on to the fork in between its beams 44. The furnace or oven door is then closed. The operator then advances the pedestal 23 so it locates the fork with the enamelled articles thereon in position C. This brings the loaded fork from A, into location B, to be given the heating or firing process in its turn in the same way. The other forks are advanced to their various advanced positions and treated according to the various requirements of the particular locations, such as removal from furnace, cooling, unloading and loading. The forks are made adjustable on the booms, by means of the screw arrangement 93 provided. Air is fed to the balancing cylinders 37, through piping 92 which is equipped with a rotating connection of conventional design to allow the pedestal 23 to rotate without interfering with the air supply.

A (two-way) valve 94 is operated through the movement of the handle 91 in and out of the carriage to place the air pressure on the top or bottom of the piston in the cylinder 37 depending on which direction the pressure is to be applied. The valves 71, 84 and 85 are supplied with air from pipe 97.

It will be seen that the machine has several unique features, which features have been embodied in a full size working model. These features include the use of a system of booms that can handle relatively heavy work. The work can therefore be handled at various locations for individual processing at such points and such points may be substantially spaced from each other so no interference between the processes will be encountered. Where a furnace or oven is used in one of the processes, the heat radiating therefrom can be so obstructed that it will not be an inconvenience to the operators, since they will not have to approach closely to it, due to the length of the booms and the manner in which they are used. The use of a central pedestal as a support reduces the amount of floor area required for the equipment, and supports the booms at a level where operators may work under it without danger or interference. The controls can be placed wherever convenient, and through the use of air make the mechanisms economical in cost and less troublesome than other forms of power sources. The balancing of the booms by one another saves considerably in the cost of the structure, its deadweight on the floor of the building and its operative expenses. The processes can be as many as there are booms, and operators can be stationed at the stops in the sequential movement of the machine to take care of them, without being in each others way. The use of ropes while specifically shown in the drawings, is intended to permit the use of cables, chains in their place, without further description, as a matter of practice.

While but one general form of the invention is shown in the drawings and described in the specification, it is not desired to limit this application for patent to this particular form, as it is appreciated that other forms of construction could be made that would use the same principles and come within the scope of the appended claims.

Having thus described the invention, what is claimed is:

1. A machine for processing an article at four separate stations, comprising a central vertical pedestal, a rectangularly shaped cage secured to said pedestal, a multiplicity of flanged channels secured to the sides of the cage, there being two channels at each corner spaced 90 degrees apart, two pairs of booms, the booms extending horizontally and being arranged 90 degrees apart about the vertical axis of the pedestal, flexible means on the cage for connecting the booms of each pair together so as to counterbalance each other, means for moving and guiding the booms vertically along the aforesaid channels, forks movable along said booms and adapted to carry the article, means for projecting said forks beyond the confines of the booms and for returning them to the booms and means for rotating the central pedestal from station to station.

2. A machine as set forth in claim 1 including means for locking the pedestal temporarily at each station.

3. A machine as set forth in claim 1, including a carriage slidable along each boom and carrying the forks.

4. A machine as set forth in claim 1, wherein the means for rotating the pedestal consist of a power cylinder and means for controlling compressed fluid thereto, in combination with a power lock for locking the pedestal temporarily at each station.

WILLIAM W. PAUL.

REFERENCES CITED

The following references are of record in the file of this patent:

UNITED STATES PATENTS

| Number | Name | Date |
| --- | --- | --- |
| 357,234 | Sargent | Feb. 8, 1887 |
| 426,046 | McCleane et al. | Apr. 22, 1890 |
| 891,796 | Cooper | June 23, 1908 |
| 980,004 | Reeder | Dec. 27, 1910 |
| 1,606,960 | Reeves | Nov. 16, 1926 |
| 1,775,381 | Angus | Sept. 9, 1930 |

FOREIGN PATENTS

| Number | Country | Date |
| --- | --- | --- |
| 33,584 | France | July 3, 1928 |